(12) United States Patent
Bierwirth

(10) Patent No.: US 7,540,241 B2
(45) Date of Patent: Jun. 2, 2009

(54) GAS GENERATOR

(75) Inventor: Sebastian Bierwirth, Rechtmehring (DE)

(73) Assignee: TRW Airbag Systems GmbH, Aschau Am Inn (DE)

( * ) Notice: Subject to any disclaimer, the term of this patent is extended or adjusted under 35 U.S.C. 154(b) by 430 days.

(21) Appl. No.: 11/416,743

(22) Filed: May 3, 2006

(65) Prior Publication Data

US 2006/0254454 A1 Nov. 16, 2006

(30) Foreign Application Priority Data

May 13, 2005 (DE) .................. 20 2005 007 611 U

(51) Int. Cl.
*C06D 5/00* (2006.01)

(52) U.S. Cl. ............. 102/530; 102/202.12; 102/202.14; 280/741

(58) Field of Classification Search ................. 102/530, 102/531, 202.5, 202.9, 202.12, 202.14; 280/736, 280/741

See application file for complete search history.

(56) References Cited

U.S. PATENT DOCUMENTS

| | | | |
|---|---|---|---|
| 5,131,679 A | 7/1992 | Novak et al. | |
| 5,269,560 A | 12/1993 | O'Loughlin et al. | |
| 5,487,559 A | 1/1996 | Headley | |
| 5,558,366 A * | 9/1996 | Fogle et al. | 280/736 |
| 6,213,501 B1 | 4/2001 | Hock | |
| 6,634,299 B2 | 10/2003 | Vetter et al. | |
| 6,644,198 B1 | 11/2003 | Avetisian et al. | |
| 7,111,558 B2 * | 9/2006 | Brede et al. | 102/202.9 |
| 7,124,688 B2 * | 10/2006 | Avetisian et al. | 102/202.7 |
| 2002/0144621 A1 | 10/2002 | McFarland et al. | |
| 2008/0022880 A1* | 1/2008 | Bierwirth et al. | 102/530 |

FOREIGN PATENT DOCUMENTS

| | | |
|---|---|---|
| DE | 4141620 | 7/1992 |
| DE | 4141908 | 7/1992 |
| DE | 19533606 | 3/1996 |
| DE | 20020099 | 5/2001 |

* cited by examiner

*Primary Examiner*—James S Bergin
(74) *Attorney, Agent, or Firm*—Tarolli, Sundheim, Covell & Tummino LLP

(57) ABSTRACT

A gas generator includes a generator housing (12), an igniter device mounting opening (18) which has an edge (22), an igniter device and a booster chamber (24) having a peripheral wall (26). The igniter device has a prefabricated igniter (16) sealed off towards the exterior, a booster charge (23) adjoining the igniter (16) and an injected plastic base (20). The edge (22) of the igniter device mounting opening (18) for fastening the igniter device to the generator housing (12) is embedded in the injected plastic base (20) during injecting. Connectors (14) leading to the igniter (16) are embedded into the plastic base (20) during injecting and the plastic base (20) continues in one piece into the booster chamber (24) by forming a peripheral wall (26) of the booster chamber (24) which the booster charge (23) directly adjoins.

17 Claims, 5 Drawing Sheets

GAS GENERATOR

TECHNICAL FIELD

The invention relates to a gas generator.

BACKGROUND OF THE INVENTION

Gas generators as part of a restraint arrangement in vehicles have an igniter device which can ignite a booster charge which is provided in a booster chamber. Gases emerging from outflow openings of the booster chamber then ignite the propellant present in an adjoining combustion chamber, by means of which a gas bag can be inflated.

The booster chamber which holds the igniter device and the booster charge, consists for example of welded steel parts or aluminium castings. Booster chambers which are constructed in such a way must be produced in additional manufacturing steps and be connected with additional components.

The object of the invention consists in providing a gas generator which is able to be produced simply and at a favourable cost.

BRIEF SUMMARY OF THE INVENTION

According to the invention, a gas generator comprises a generator housing, an igniter device mounting opening which has an edge, an igniter device and a booster chamber which has a peripheral wall. The igniter device has a prefabricated igniter sealed off towards the exterior, a booster charge adjoining the igniter and an injected plastic base. The edge of the igniter device mounting opening for fastening the igniter device to the generator housing is embedded in the injected plastic base during injecting. Connectors leading to the igniter are embedded into the plastic base during injecting and the plastic base continues in one piece into the booster chamber by forming a peripheral wall of the booster chamber which the booster charge directly adjoins. The booster chamber is therefore injected onto the plastic base, more precisely it is also injected whilst the igniter device is being injected in. The injected plastic layer is produced in one process step and is constructed in one piece. In this way, an additional manufacturing step is eliminated and, furthermore, no additional components forming the peripheral wall of the booster chamber are necessary. The gas generator can therefore be produced at a favourable cost and in a simple manner.

The booster charge is preferably contained entirely in the filling volume which is defined by the peripheral wall.

The peripheral wall preferably has regions with predetermined outflow openings. The outflow openings make it possible for gas which is generated in the booster chamber, after the igniting of the igniter device, to be able to flow into an adjoining combustion chamber. The combustion chamber, filled with a propellant, can then inflate a gas bag adjoining it.

The outflow openings can be closed in the non-ignited state and can be opened after the igniter device is ignited.

The peripheral wall has thinner walls for example in the regions of the outflow openings than in the remaining regions, such that the regions having thinner walls are opened after the igniter device is ignited.

In accordance with an embodiment, the peripheral wall has a constant thickness in all regions.

A cap is preferably provided, which delimits the booster chamber on the side lying opposite the igniter. The booster charge is introduced before the cap is applied. As the adjoining combustion chamber is also filled from the side lying opposite the igniter, the filling of the booster chamber and of the combustion chamber can take place from the same side, whereby the filling is simplified.

According to an embodiment, the cap is supported on a section of the generator housing which lies opposite the mounting opening of the igniter device.

The cap is preferably displaceable and is acted upon by a spring-elastic element in the non-ignited state such that it covers the regions of the outflow openings. The booster charge is mounted so as to be pre-stressed owing to the spring-elastic element; the booster charge, which is in tablet form, therefore does not rub together and therefore does not become worn. The action of the gas generator is therefore guaranteed even after several years.

The cap can be turned over the booster chamber and can support the peripheral wall laterally.

A reinforcement layer preferably at least partially adjoins the peripheral wall. This reinforcement layer guarantees a sufficient strength to the plastic-injected peripheral wall, which is necessary owing to the pressure occurring in the booster chamber during ignition.

In accordance with an embodiment, the reinforcement layer is made of metal.

The reinforcement layer is surrounded by a plastic wall, for example, which is injected onto the peripheral wall.

The reinforcement layer preferably has outflow openings. These outflow openings are already provided in the non-ignited state, being greater than the outflow openings in the peripheral wall, such that a simpler installation is made possible because it is not necessary to adjust and align the reinforcement layer to the outflow openings of the peripheral wall.

The reinforcement layer can be constructed in a spiral or ring shape. A spiral-shaped reinforcement layer provides for a good stabilization with a pressure which is applied perpendicularly to the peripheral wall.

Alternatively, the reinforcement layer is arranged along the peripheral wall in longitudinal direction.

BRIEF DESCRIPTION OF THE PREFERRED EMBODIMENTS

Figure 1:
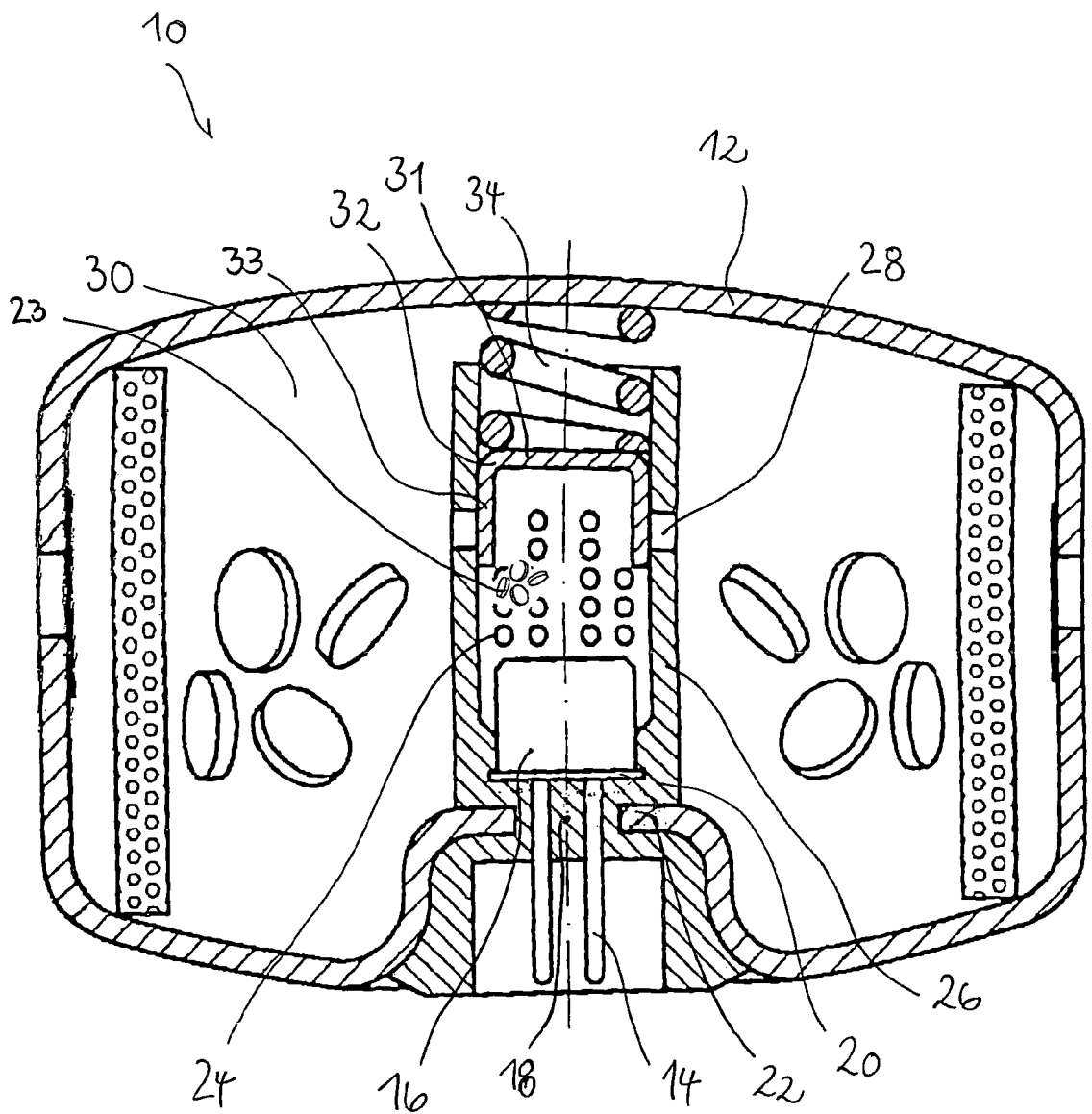
FIG. 1 shows a sectional view of a gas generator according to the invention in accordance with a first embodiment.

In the figures, a gas generator 10 with a generator housing 12 is shown, which has a centrally arranged igniter device. The igniter device has an igniter 16 which is sealed with respect to the exterior and is provided with electrical connectors 14, e.g. pins or wires. The connectors 14 project through an igniter device mounting opening 18 in the housing 12 out from the latter. The igniter 16 together with the connectors 14 are embedded in a plastic base 20 when it is injected. The opening 18 is delimited by an edge 22 of the housing 12 surrounding it.

The upper end of the igniter 16 in accordance with the figures opens out into a booster chamber 24 which is filled with a booster charge 23, which chamber 24 has a peripheral wall 26. The peripheral wall 26 is injected in one piece with the plastic base 20 in one manufacturing step. During the injecting of the base 20 and peripheral wall 26, the igniter 18 is embedded into the base 20, and in addition this unit is integrated into the housing 12 by the edge 22 being embedded into the plastic during the injecting. Hereby, a stable, gas-tight integration of the igniter device into the housing 12 is brought about.

Outflow openings 28, only two of which are shown in the figures, are provided in the peripheral wall 26 of the booster chamber 24, via which gas generated in the booster chamber 24 can overflow into an adjoining combustion chamber 30. The combustion chamber 30 is filled here with a suitable propellant, shown diagrammatically, and likewise has outflow openings and a filter, which are not entered into in further detail here.

In addition, reference is to be made to the various embodiments.

In FIG. 1, the peripheral wall 26 of constant thickness is provided with outflow openings 28. A cap 32, formed from a shaped sheet metal part and displaceable along the peripheral wall 26, closes the outflow openings 28 and the booster chamber 24 in the non-ignited state, by being pressed inwards by a spring-elastic element 34 which rests against a side of the generator housing 12 lying opposite the igniter 16. The spring-elastic element 34 makes it possible for the booster charge 23, in tablet form, which is provided in the booster chamber 24, to be mounted tightly and for the individual tablets thereby to be unable to rub against each other and become worn down.

As the booster chamber 24 is of circular cylindrical shape, the cap 32 accordingly has a circular base part 31 with projecting edges 33, the diameter of the cap 32 being selected such that the projecting edges 33 lie against the peripheral wall 26 of the booster chamber 24 over the entire circumference.

Upon activation of the gas generator 10, firstly the igniter 16 and then the booster charge 23 are ignited. Owing to the development of gas, at a moment (determined inter alia by the displacement resistance of the cap 32 in the booster chamber 24) after the ignition, the cap 32 is displaced upwards along the booster chamber 24 contrary to the action of the spring-elastic element 34 in accordance with FIG. 1, in order to expose the outflow openings 28. The propellant contained in the combustion chamber 30 is then ignited by the hot gases overflowing from the booster chamber 24, and a gas bag adjoining thereto is inflated (not shown).

Figure 2:
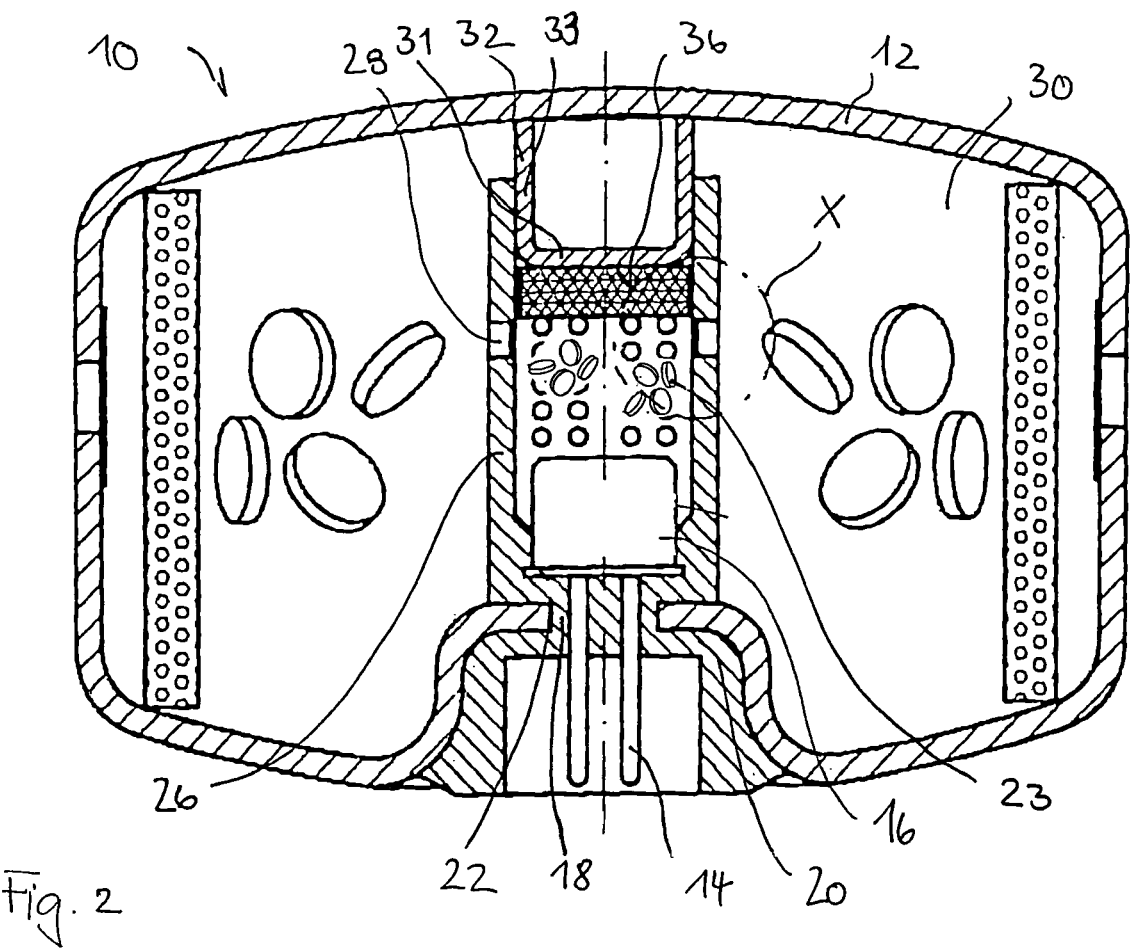
FIG. 2 shows a sectional view of the gas generator according to the invention in accordance with a second embodiment.
Figure 3:
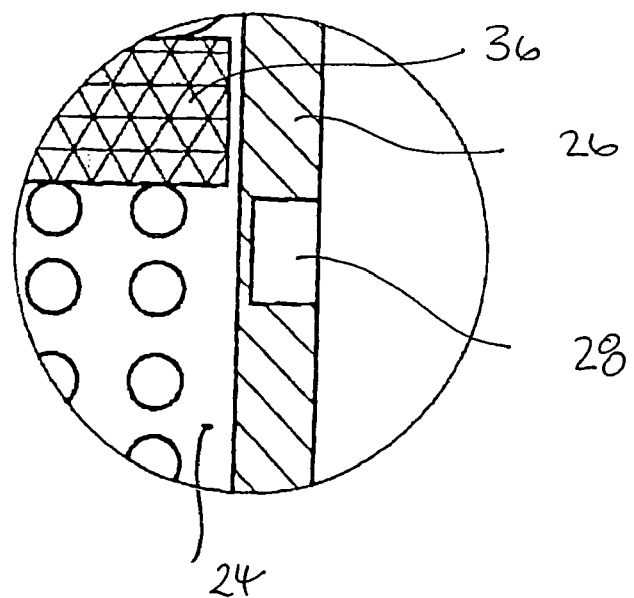
FIG. 3 shows an enlarged cut-out of the region designated by X in FIG. 2.

In FIGS. 2 and 3 the gas generator 10 is shown in a second embodiment, known components being provided with the same reference numbers in this embodiment and with reference to be made in this respect to the above explanations.

The peripheral wall 26, injected with the plastic base 20, has thinner walls in the regions which form the outflow openings 28 after the igniting of the igniter device, than in the remaining regions.

A non-displaceable cap 32 is provided which delimits the booster chamber 24 on the side lying opposite the igniter 16 and is formed from a shaped sheet metal part in a single piece. The cap 32 rests by the projecting edges 33 against the generator housing 12. A filling body 36 which pre-stresses the booster charge 23 in a similar manner to the spring-elastic element 34, is provided between the cap 32 and the booster charge 23.

This embodiment differs from the first embodiment in the mode of operation of the gas generator 10 in that the cap 32 is non-displaceable and the peripheral wall 26 is destroyed in the region of the predetermined outflow openings 28 owing to the development of gas after the igniting of the igniter 16, in order to open the outflow openings 28.

Figure 4:
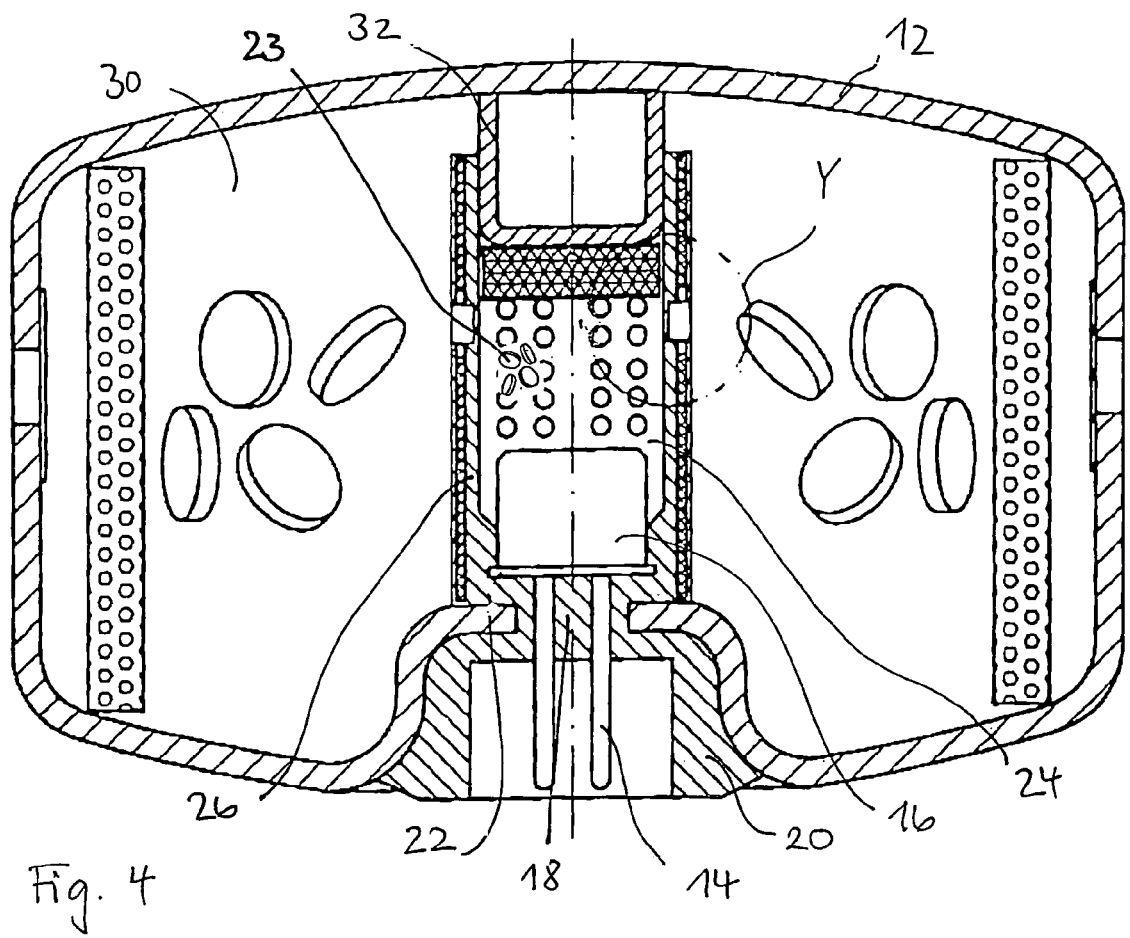
FIG. 4 shows a sectional view of the gas generator according to the invention in accordance with a third embodiment.
Figure 5:
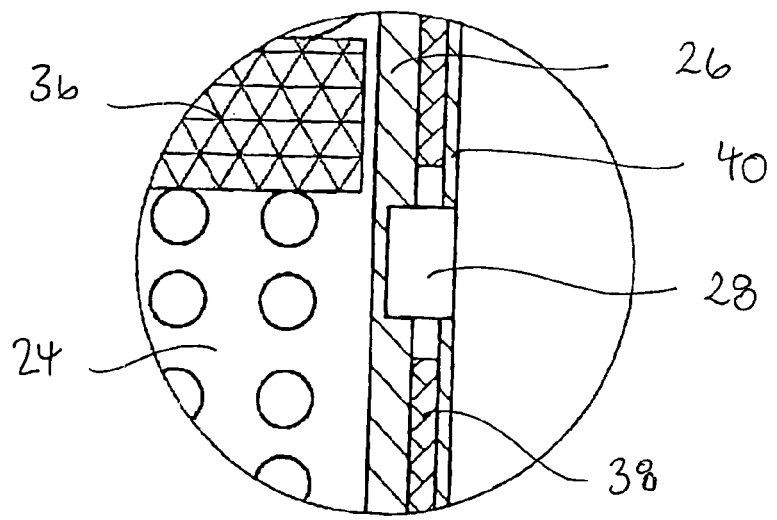
FIG. 5 shows an enlarged cut-out of the region designated by Y in FIG. 4.

The gas generator 10 is shown in a further embodiment in FIGS. 4 and 5. This differs from the second embodiment only in that a reinforcement layer 38 of metal adjoins the peripheral wall 26. The reinforcement layer 38 entirely surrounds the peripheral wall 26 and is itself surrounded by an injected plastic wall 40 on the exterior. The external injected plastic wall 40 may, however, also be dispensed with (not shown).

Both the outer plastic wall 40 and also the reinforcement layer 38 have outflow openings (FIG. 5). The outflow openings of the reinforcement layer 38 are already opened here in the non-ignited state and are larger than the outflow openings 28 provided in the peripheral wall 26 and in alignment thereto, such that when the reinforcement layer 38 is installed, an adjusting and aligning to the outflow opening 28 in the peripheral wall 26 can be omitted.

The reinforcement layer 38 shown here is arranged in longitudinal direction along the peripheral wall 26, but it could also run in a spiral or ring shape around the peripheral wall 26 (not shown).

Figure 6:
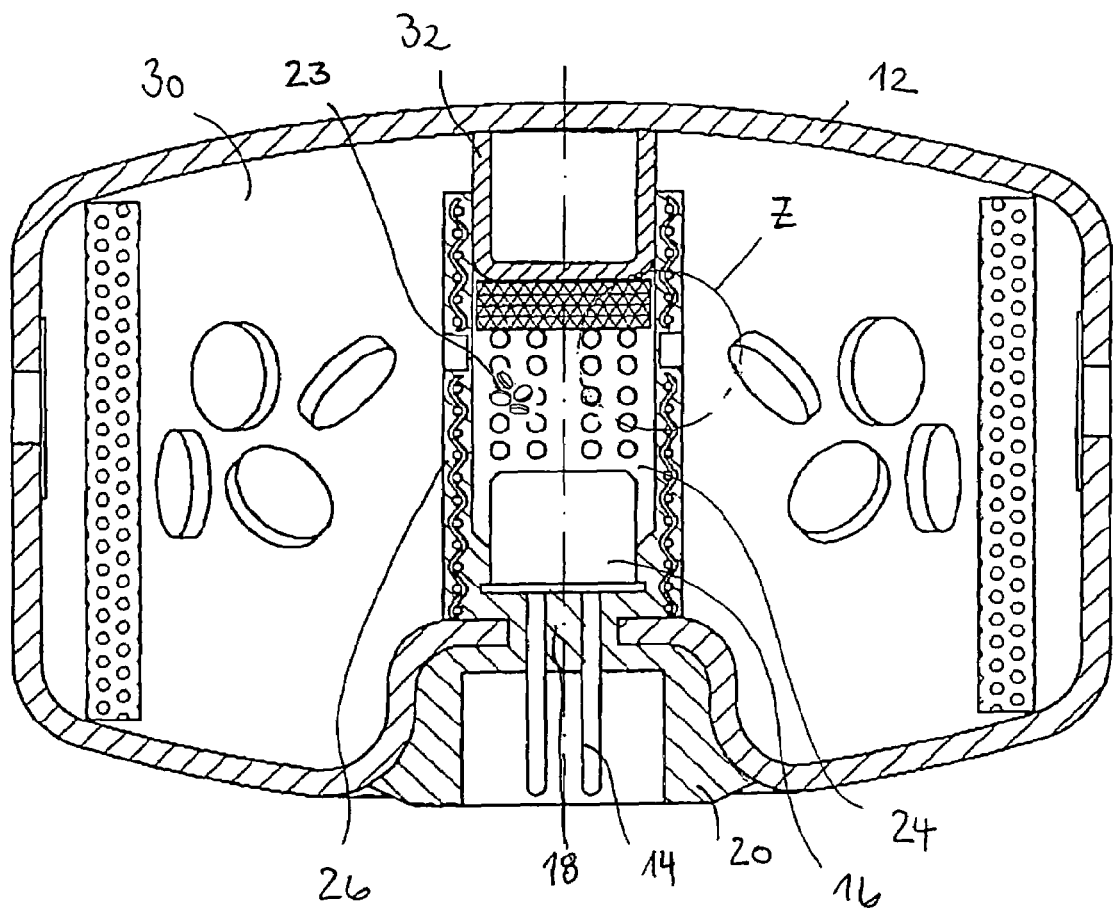
FIG. 6 shows a sectional view of the gas generator according to the invention in accordance with a fourth embodiment.
Figure 7:
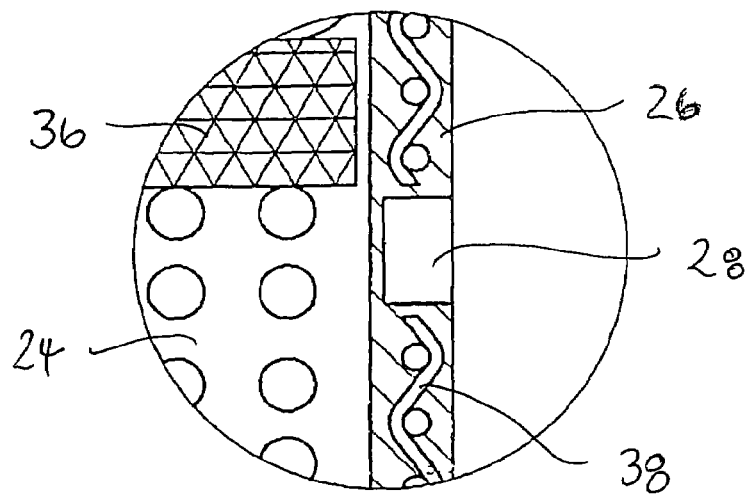
FIG. 7 shows an enlarged cut-out of the region designated by Z in FIG. 6.

A further embodiment of the gas generator 10 is shown in FIGS. 6 and 7, which has a reinforcement layer 38 which is embedded into the peripheral wall 26. The reinforcement layer 38 is placed into the injection mould before the injecting and during the injecting of the peripheral wall 26 it is injected around by the latter.

Figure 8:
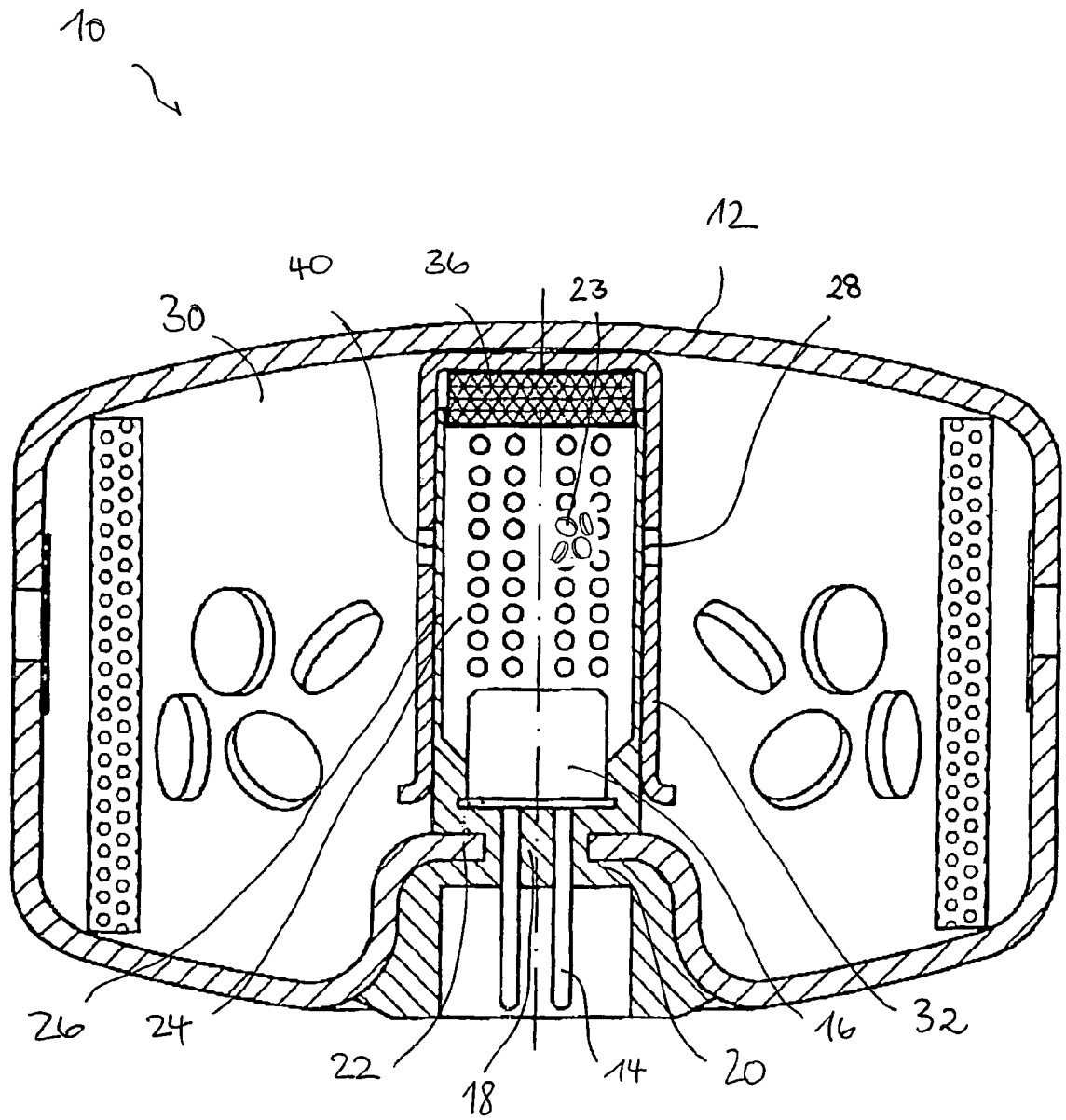
FIG. 8 shows a sectional view of the gas generator according to the invention in accordance with a fifth embodiment.

FIG. 8 shows a further embodiment of the gas generator 10. The peripheral wall 26 has a constant thickness here and, in the non-ignited state, has regions with predetermined outflow openings 28 which are opened after ignition and are not weakened.

The cap 32, provided with outflow openings 42, has a larger diameter in this embodiment than the peripheral wall 26 and is turned over the booster chamber 24. When the device is ignited, the peripheral wall 26 breaks open in the region of the outflow openings 42 to form the outflow openings 28.

In all the embodiments that are shown, the housing 12 consists of an upper and a lower shell which are connected with each other at the edge. The housing 12 is illustrated in one piece solely to simplify the illustration.

The production of the gas generator 10 according to the invention is briefly explained below. Firstly, the lower shell and the igniter 16 are positioned in an injection mould. Then the base 20 and the peripheral wall 26 are injected in one processing step. The booster charge 23 is now filled into the booster chamber which has been produced, which is then closed by the cap 32. The filter and the propellant are now filled into the combustion chamber 30. Then the spring-elastic element 34, if present, can also be put in place if required, before the cover-like upper shell is placed onto the lower shell and the two parts are connected with each other.

The invention claimed is:

1. A gas generator comprising:
   a generator housing (12) having an edge (22) defining an igniter device mounting opening (18) and
   an igniter device having a prefabricated igniter (16) sealed off towards the exterior and having an injected plastic base (20), into which said edge (22) of said igniter device mounting opening (18) for fastening said igniter device to said generator housing (12) is embedded during injecting, connectors (14) leading to said igniter (16) being embedded into said plastic base (20) during injecting and a booster chamber (24) outside of the igniter (16) defined by a peripheral wall (26) of said plastic base (20) and containing a booster charge (23).

2. The gas generator according to claim 1, wherein said booster charge (23) is contained entirely in a filling volume defined by said peripheral wall (26).

3. The gas generator according to claim 1, wherein predetermined outflow openings (28) are provided, said peripheral wall (26) having regions with said predetermined outflow openings (28).

4. The gas generator according to claim 3, wherein said outflow openings (28) are closed in a non-ignited state and are opened after said igniter device is ignited.

5. The gas generator according to claim 3, wherein said peripheral wall (26) has thinner walls in the regions of said outflow openings (28) than in the remaining regions.

6. The gas generator according to claim 3, wherein said peripheral wall (26) has a constant thickness in all regions.

7. The gas generator according to claim 1, wherein a cap (32) is provided, which delimits said booster chamber (24) on the side lying opposite said igniter (16).

8. The gas generator according to claim 7, wherein a spring-elastic element (34) is provided and said cap (32) is displaceable and is acted upon by said spring-elastic element (34) in the non-ignited state such that it covers the regions of said outflow openings (28).

9. The gas generator according to claim 7, wherein said cap (32) is turned over said booster chamber (24) and supports said peripheral wall (26) laterally.

10. The gas generator according to claim 1, wherein a cap (32) adjoins said booster chamber (24) on the side lying opposite said igniter (16) and is supported on a section of said generator housing (12) which lies opposite said igniter device mounting opening (18).

11. The gas generator according to claim 1, wherein a reinforcement layer (38) is provided and said reinforcement layer (38) at least partially adjoins said peripheral wall (26).

12. The gas generator according to claim 11, wherein said reinforcement layer (38) is made of metal.

13. The gas generator according to claim 11, wherein said reinforcement layer (38) is surrounded by a plastic wall (40) which is injected onto said peripheral wall (26).

14. The gas generator according to claim 11, wherein said reinforcement layer (38) has outflow openings (28).

15. The gas generator according to claim 11, wherein said reinforcement layer (38) is constructed in one of a spiral shape and ring shape.

16. The gas generator according to claim 11, wherein said reinforcement layer (38) is arranged along said peripheral wall (26) in longitudinal direction.

17. The gas generator according to claim 1, wherein a reinforcement layer (38) embedded into said peripheral wall (26) is provided.

* * * * *